United States Patent
Kawakubo et al.

(10) Patent No.: US 9,944,790 B2
(45) Date of Patent: Apr. 17, 2018

(54) POLYCARBONATE RESIN COMPOSITION WITH SUPERIOR FLUIDITY AND MOLDING THEREOF

(71) Applicant: KANEKA CORPORATION, Osaka, Osaka (JP)

(72) Inventors: Hidekazu Kawakubo, Settsu (JP); Shuji Taketani, Westerlo-Oevel (BE); Tetsuro Yamamoto, Settsu (JP)

(73) Assignee: KANEKA CORPORATION, Osaka-shi (JP)

( * ) Notice: Subject to any disclaimer, the term of this patent is extended or adjusted under 35 U.S.C. 154(b) by 315 days.

(21) Appl. No.: 14/394,940

(22) PCT Filed: Apr. 30, 2013

(86) PCT No.: PCT/JP2013/062607
§ 371 (c)(1),
(2) Date: Oct. 16, 2014

(87) PCT Pub. No.: WO2013/162043
PCT Pub. Date: Oct. 31, 2013

(65) Prior Publication Data
US 2015/0099106 A1    Apr. 9, 2015

(30) Foreign Application Priority Data

Apr. 27, 2012  (JP) ................................ 2012-103690
Jun. 15, 2012  (JP) ................................ 2012-136026

(51) Int. Cl.
| | | |
|---|---|---|
| *C08L 69/00* | (2006.01) |
| *B29C 45/00* | (2006.01) |
| *C08G 63/86* | (2006.01) |
| *C08G 63/672* | (2006.01) |
| *C08L 67/02* | (2006.01) |
| *B29K 67/00* | (2006.01) |
| *B29K 69/00* | (2006.01) |
| *B29K 71/00* | (2006.01) |
| *B29K 105/00* | (2006.01) |

(52) U.S. Cl.
CPC .......... *C08L 69/00* (2013.01); *B29C 45/0001* (2013.01); *C08G 63/672* (2013.01); *C08G 63/86* (2013.01); *C08L 67/025* (2013.01); *B29K 2067/003* (2013.01); *B29K 2069/00* (2013.01); *B29K 2071/00* (2013.01); *B29K 2105/0085* (2013.01); *B29K 2105/0088* (2013.01); *C08L 2205/03* (2013.01); *C08L 2207/53* (2013.01)

(58) Field of Classification Search
None
See application file for complete search history.

(56) References Cited

FOREIGN PATENT DOCUMENTS

| | | | |
|---|---|---|---|
| JP | 2008075087 A | * | 4/2008 |
| JP | 2009-91440 A | | 4/2009 |
| JP | 20100222393 A | * | 7/2010 |
| JP | 2010-254739 A | | 11/2010 |
| JP | 2011-231280 A | | 11/2011 |

OTHER PUBLICATIONS

Machine_English_Translation_JP_20100222393_A; Fujita, K; Resin Composition Having Excellent Moldability; JPO; whole document.*
Machine_English_Translation_JP_2008075087_A; Mekata, Tetsuo; Vibration-Damping Resin Composition and Molded Article Using the Same; JPO; whole document.*
International Search Report dated May 28, 2013 issued in corresponding application No. PCT/JP2013/062607.

* cited by examiner

*Primary Examiner* — Tahseen N Khan
(74) *Attorney, Agent, or Firm* — Westerman, Hattori, Daniels & Adrian, LLP

(57) ABSTRACT

A resin composition including 40 parts by weight or more and less than 95 parts by weight of a polycarbonate resin and 5 parts by weight or more and less than 60 parts by weight of a polyester-polyether copolymer as a base resin, wherein the polyester-polyether copolymer is a copolymer which is obtained by a polymerization using a germanium compound catalyst, includes aromatic polyester units and modified polyether units represented by the following general formula 1, and has an IV value within a range of 0.30 to 1.00 can be well-balanced in moldability, heat resistance, impact resistance, and low linear expansion property, without deteriorating a surface appearance of a molding obtained therefrom.

16 Claims, No Drawings

POLYCARBONATE RESIN COMPOSITION WITH SUPERIOR FLUIDITY AND MOLDING THEREOF

TECHNICAL FIELD

The present invention relates to a resin composition and a molding using the resin composition, such as parts for a household electric appliance or parts for a vehicle (hereinafter also referred to a "molded article").

BACKGROUND ART

Polycarbonate resins have hitherto been known as they have the best impact resistance and a good heat resistance, among engineering plastics. For that reason, they are used in various fields utilizing these features; however, they have defects such as a poor chemical resistance, a poor molding processability, and a thickness dependence on the impact resistance.

On the other hand, thermoplastic polyesters have a good chemical resistance and a good molding processability, but they have defects of a poor impact resistance and a poor dimensional stability.

With the aim of utilizing the features of each resin and covering the defects, various resin compositions have been proposed. For example, it has been attempted that the impact resistance, the heat resistance, the chemical resistance, the weatherability, and the moldability, which are required for automobile parts, are simultaneously satisfied.

A resin composition including a polycarbonate resin and a polyester modified with polyethylene glycol, polytetramethylene glycol, or the like, is also proposed. However, the composition has an improved moldability, but the heat resistance thereof is insufficient for exterior parts for automobiles.

A resin composition including a polycarbonate resin, and a polyester-polyether copolymer having block units of a polyalkylnene glycol adduct of a bisphenol and produced using a germanium catalyst, is also proposed. For example, Patent Document 1 discloses a resin composition including 30 parts of a polyethylene terephthalate block-copolymer having 30% of a polyethylene oxide adduct of bisphenol A having a molecular weight, of 1000 and 70 parts of polycarbonate, whose moldability, heat resistance and impact resistance are well-balanced without deteriorating its surface appearance of the molded article. The publication discloses that in this composition, the impact resistance is improved by admixing a graft-copolymer including an elastomer as an impact resistance improver.

At the present day, in electric appliances such as cell phones and personal computer housings and parts for vehicles such as fenders, door panels, and back door panels for automobiles, weight reduction is strongly desired, and accordingly it is advanced to reduce a wall thickness of a molded article. In order to response this requirement, a resin composition, which is a molding material for the molded article, is desired to have a further improved moldability and impact resistance.

Patent Document 1 discloses, as described above, that the resin composition having a good thin-wall moldability can be obtained by using the polyester-polyether copolymer, and the composition can provide products with a high quality in electric appliances such as cell phones and personal computer housings, and large-sized molded articles such as fenders, door panels, and back door panels for automobiles, which are required to have a reduced wall-thickness. However, in order to response the requirement to further reduce the weight, if the composition in Patent Document 1 is used for a large-sized molding which is required to have a further reduced wall thickness, the resulting fluidity is sometimes insufficient. In such a case, a measure is taken in which a molding temperature is set at a higher temperature to improve the fluidity. As a result, the resin is thermally deteriorated to generate decomposed gases, thus resulting in worsened appearance of the molding, with the impact resistance and the heat resistance being also decreased.

CITATION LIST

Patent Literatures

Patent Document 1: JP-A No. 2010-254739

DISCLOSURE OF THE INVENTION

Technical Problem

The present invention aims at providing a resin composition including a polycarbonate resin and a thermoplastic polyester, and being capable of providing a resin composition which is well-balanced in moldability, heat resistance, impact resistance, and low linear expansion property, without deteriorating the surface appearance of the molding, even if the molded article is a large-sized and thin-wall molded article.

Solution to Problem

The present inventors have repeated a painstaking study; as a result, they have found that because a chain length of the polyalkylene glycol in the polyester-polyether copolymer and an IV value of the polyester-polyether copolymer in the composition are not appropriate, the resin composition of Patent Document 1 is insufficient in the thin-wall moldability.

The present inventors have coped with the causes found as described above, have found that when a polycarbonate resin and a specific polyester-polyether copolymer are combined as main components to form a resin composition, the moldability can be drastically improved with suppressing the decrease of the surface appearance and the mechanical properties such as the heat resistance, the impact resistance, and the low linear expansion property, and have accomplished the present invention. The term "surface appearance" includes not only the surface appearance of the molding itself but also the surface appearance of the molding whose surface is coated.

The gist of the present invention is as follows:

1) A resin composition including 40 parts by weight or more and less than 95 parts by weight of a polycarbonate resin and 5 parts by weight or more and less than 60 parts by weight of a polyester-polyether copolymer as a base resin, wherein the polyester-polyether copolymer is obtained by a polymerization using a germanium compound catalyst, includes aromatic polyester units and modified polyether units represented by the following general formula 1, and has an IV value within a range of 0.30 to 1.00.

[C.1]

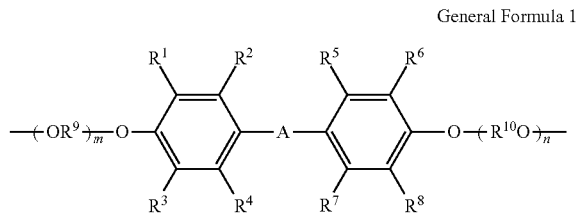

General Formula 1

(wherein -A- is —O—, —S—, —SO—, —SO$_2$—, —CO—, an alkylene group having 1 to 20 carbon atoms, or an alkylidene group having 6 to 20 carbon atoms; $R^1$, $R^2$, $R^3$, $R^4$, $R^5$, $R^6$, $R^7$, and $R^8$ are each a hydrogen atom, a halogen atom, or a monovalent hydrocarbon group having 1 to 5 carbon atoms; $R^9$ and $R^{10}$ are each a bivalent hydrocarbon group having 1 to 5 carbon atoms; they may be the same or different; and m and n show the number of repeating oxyalkylene units, and $20 \leq m+n \leq 60$.)

2) The resin composition according to 1), wherein the polyester-polyether copolymer has an IV value within a range of 0.45 to 0.60.

3) The resin composition according to 1) or 2), wherein the polyester-polyether copolymer includes 85 to 65% by weight of the aromatic polyester units and 15 to 35% by weight of the modified polyether units.

4) The resin composition according to any one of 1) to 3), wherein the aromatic polyester unit is one or more units selected from the group consisting of a polyethylene terephthalate unit, a polybutylene terephthalate unit, and a polypropylene terephthalate unit.

5) The resin composition according to any one of 1) to 4), wherein the modified polyether unit is a modified polyether unit represented by the following general formula 2:

[C.2]

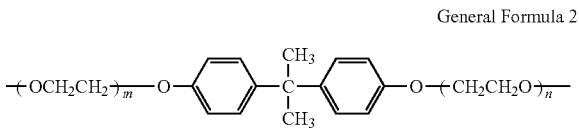

General Formula 2

(wherein m and n show the number of repeating oxyalkylene units, and $20 \leq m+n \leq 60$.)

6) The resin composition according to any one of 1) to 5), which further comprises 0.5 to 40 parts by weight of an impact resistance improver.

7) The resin composition according to 6), wherein the impact resistance improver is one or more members selected from the group consisting of (1) a core/shell graft-polymer comprising 10 to 90% by weight of a core which is one or more rubbery polymers selected from the group consisting of a polybutadiene, a butadiene-styrene copolymer, a butadiene-acrylic acid ester copolymer, and a polyorganosiloxane, and 90 to 10% by weight of a shell which is formed of a polymer obtained by polymerizing one or more monomers selected from the group consisting of an aromatic vinyl compound, a vinyl cyanide compound, and a (meth)acrylic acid ester compound in the presence of the core, (2) a polyolefin polymer, and (3) an olefin-unsaturated carboxylic acid ester copolymer.

8) The resin composition according to any one of 1) to 7), which further comprises 5 to 100 parts by weight, based on 100 parts by weight of the base resin, of a platy filler having a number average long diameter of 0.1 µm or more and 40 µm or less.

9) The resin composition according to any one of 1) to 8), wherein, in the platy filler, a ratio (weight basis) of (4) a platy filler having a number average long diameter of 0.1 µm or more and less than 25 µm to (5) a platy filler having a number average long diameter of 25 µm or more and 40 µm or less, (4)/(5), is from 25%/75% to 50%/50% of the platy filler amount.

10) The resin composition according to any one of 1) to 9), which further comprises 5 to 100 parts by weight, based on 100 parts by weight of the base resin, of a long glass fiber.

11) A molding including the resin composition according to any one of 1) to 10).

12) The molding according to 11), which has a projected area of more than 30000 mm$^2$, a length from a gate to an edge of more than 500 mm, an average wall thickness of less than 2.5 mm, and a linear expansion coefficient in a face, determined at a measurement temperature between −30° C. and +80° C., of $6.0 \times 10^{-5}$/° C. or less.

13) The molding according to 11), which has a projected area of more than 30000 mm$^2$, a length from a gate to an edge of more than 500 mm, an average wall thickness of less than 2.5 mm, and a linear expansion coefficient in a face, determined at a measurement temperature between −30° C. and +80° C., of $4.0 \times 10^{-5}$/° C. or less.

14) The molding according to 11), which has a projected area of more than 60000 mm$^2$, an average wall thickness of less than 2.5 mm, and a linear expansion coefficient in a face, determined at a measurement temperature between −30° C. and +80° C., of $6.0 \times 10^{-5}$/° C. or less.

15) The molding according to 11), which has a projected area of more than 60000 mm$^2$, an average wall thickness of less than 2.5 mm, and a linear expansion coefficient in a face, determined at a measurement temperature between −30° C. and +80° C., of $4.0 \times 10^{-5}$/° C. or less.

16) The molding according to 11), which is an exterior part for an automobile and obtained by an injection molding.

17) The molding according to 11), which is selected from a garnish, a pillar, and a spoiler.

18) A method for producing the molding according to 11), including obtaining the molding by an injection molding.

Advantageous Effects of Invention

The resin composition of the present invention has the excellent moldability and, at the same time, is well-balanced in the moldability, heat resistance, impact resistance, and low linear expansion property. In addition, the molding thereof has the excellent surface appearance, heat resistance, impact resistance, and low linear expansion property. Furthermore, the resin composition of the present invention has the excellent large-sized, thin-wall moldability.

The molding from the resin composition of the present invention is preferably used as parts for a household electric appliance, parts for a vehicle, and the like. The parts for a household electric appliance, the parts for a vehicle, and the like, which are obtained by molding the resin composition of the present invention, accordingly, have the excellent surface appearance, heat resistance, impact resistance, and low linear expansion property.

DESCRIPTION OF EMBODIMENTS (Resin Composition)
1. General Outline of Resin Composition The resin composition of the present invention includes 40 parts by weight or more and less than 95 parts by weight of a polycarbonate resin and 5 parts by weight or more and less than 60 parts by weight of a polyester-polyether copolymer (the total amount thereof being 100 parts by weight) as a base resin. The resin composition having such a composition can exert the effects of the present invention. In terms of the balance in the impact resistance, the heat resistance, the dimensional stability, the chemical resistance, and the molding processability, it is preferable to include 50 parts by weight or more and less than 90 parts by weight of the polycarbonate resin and 10 parts by weight or more and less than 50 parts by weight of the polyester-polyether copolymer, and it is more preferably to include 60 parts by weight or more and less than 80 parts by weight of the polycarbonate resin and 20 parts by weight or more and less than 40 parts by weight of the polyester-polyether copolymer.

The resin composition of the present invention includes the polycarbonate resin and the specific polyester-polyether copolymer as the main component, and thus molding having the excellent appearance molding can be obtained therefrom in particular in large-sized, injection-molded articles. It is preferable to add a filler, but even if the filler is not added, the effects of the excellent fluidity and thermal stability can be obtained.

The resin composition of the present invention preferably further includes 0.5 to 40 parts by weight of an impact resistance improver to further improve the impact resistance. The amount thereof is more preferably from 1 to 20 parts by weight in terms of the heat resistance, the rigidity, the moldability, and the like. When the resin composition of the present invention is used as the preferable use, i.e., the parts for a vehicle, the amount is more preferably from 2 to 10 parts by weight in order to obtain the impact resistance strength and the resistance heat necessary therefor.

As the impact resistance improver, one or more compounds selected from the group consisting of (1) core/shell graft-polymers, (2) polyolefin polymers, (3) olefin-unsaturated carboxylic acid ester copolymers, and (4) thermoplastic polyester elastomers are preferable.

The core/shell graft-polymer (1) described above includes preferably 10 to 90% by weight of a core which is one or more rubbery polymers selected from the group consisting of polybutadiene, butadiene-styrene copolymers, butadiene-acrylic acid ester copolymers, and polyorganosiloxane, and 90 to 10% by weight of a shell which is formed of a polymer obtained by polymerizing one or more monomers selected from the group consisting of aromatic vinyl compounds, vinyl cyanide compounds, and (meth)acrylic acid ester compounds in the presence of the core.

The resin composition of the present invention includes preferably a platy filler. When the composition includes the platy filler, the heat resistance of the molding from the resin composition of the present invention can be further improved, and the low linear expansion property is also improved. The platy filler has preferably a number average long diameter of 0.1 µm or more and 40 µm or less for obtaining the effect of the low linear expansion property, and is included preferably in a content of 5 to 100 parts by weight based on 100 parts by weight of the base resin. The content is more preferably from 10 to 70 parts by weight, and further more preferably from 15 to 40 parts by weight, based on 100 parts by weight of the base resin.

The resin composition of the present invention includes preferably a long glass fiber. When the composition includes the long glass fiber, the heat resistance and the impact property of the molding from the resin composition of the present invention can be further improved. The content of the long glass fiber is preferably from 5 to 100 parts by weight, based on 100 parts by weight of the resin, more preferably from 10 to 50 parts by weight, and further more preferably from 15 to 35 parts by weight.

In the present invention, it is possible to use the platy filler and the long glass fiber at the same time in the amounts of parts described above.

The resin composition of the present invention is the resin composition including the polycarbonate resin and the specific polyester-polyether copolymer as the base resin, and thus the moldings having the more excellent appearance than that of moldings from conventional resin compositions can be obtained, in particular, in the large-sized injection molded articles. Furthermore, when the specific platy filler is added to the resin composition, the resulting composition has the excellent molding processability, which is capable of providing the molding having the sufficient dimensional stability, while the weight reduction and the reduction of the wall thickness can be realized. In particular, it can be used as the resin composition capable of providing the moldings which are large-sized and have the reduced wall thickness and the excellent dimensional stability and appearance. Please note that even if the platy filler is not added to the base resin, the base resin has the effects of the excellent fluidity and thermal stability.

The resin composition of the present invention preferably includes further a stabilizer in an amount of 0.01 to 4 parts by weight, based on 100 parts by weight of the base resin and more preferably 0.1 to 2 parts by weight, in order to prevent thermal deterioration during the mold-processing.

The general outlines of the resin composition of the present invention are as described above. The main structural components in the resin composition described above are described in more detailed below.

2. Polycarbonate Resin

The polycarbonate resin used in the present invention refers to a polycarbonate resin derived from a compound having 2 phenolic hydroxyl groups (hereinafter referred to as a bivalent phenol), which is usually obtained by a reaction of the bivalent phenol with phosgene, or a reaction of the bivalent phenol with a carbonic acid diester.

Bisphenol A is particularly preferable as the bivalent phenol, but the bivalent phenol is not limited thereto.

The polycarbonate resin has preferably a viscosity average molecular weight of 10,000 to 60,000 in terms of the impact resistance, the chemical resistance, the molding processability, and the like.

3. Polyester-Polyether Copolymer

<1> General Outline of Polyester-Polyether Copolymer

The polyester-polyether copolymer used in the present invention refers to a copolymer obtained by a polymerization using a germanium compound catalyst, which includes aromatic polyester units and modified polyether units represented by the general formula 1, and whose IV value is preferably within a range of 0.30 to 1.00.

It is enough that the polyester-polyether copolymer includes the structural units of the aromatic polyester units and the specific modified polyether units. In terms of the improving effect of the moldability and the maintenance of the heat resistance, however, a copolymer including 85 to 65% by weight of the aromatic polyester units and 15 to 35% by weight of the modified polyether units represented by the general formula 1 is preferable, and a copolymer including 80 to 70% by weight of the aromatic polyester units and 20 to 30% by weight of the modified polyether units is more preferable.

The molecular weight of the polyester-polyether copolymer is not particularly limited, and in usual it is preferably a molecular weight so that a logarithmic viscosity (IV) is within a range of 0.30 to 1.00 at 0.5 g/dl, measured at 25° C. in a mixed solvent of tetrachloroethane/phenol=50/50 (weight ratio). When the molecular weight is within this range, the obtained resin composition has the excellent fluidity and is well-balanced in the moldability, heat resistance, impact resistance, and low linear expansion property. The IV value is more preferably within a range of 0.45 to 0.60, in order to further improve the fluidity and further improve the balance in the moldability, the heat resistance, the impact resistance, and the low linear expansion property.

<2> Production Method of Polyester-Polyether Copolymer

The production method of the polyester-polyether copolymer may include, but is not limited to, using a germanium compound catalyst in each method below, (1) a direct esterification of three components of an aromatic dicarboxylic acid, a diol, and a modified polyether; (2) an interesterification of three components of a dialkyl aromatic dicarboxylate, a diol, and a modified polyether and/or an ester of a modified polyether; (3) a method in which a dialkyl aromatic dicarboxylate and a diol are interesterified, during or after which a modified polyether is added thereto to polycondensate the mixture; (4) a method in which a high molecular weight aromatic polyester is mixed with a modified polyether, and the mixture is interesterified in a reduced pressure in a molten state, and the like.

When an antimony compound is used as a catalyst for producing the polyester-polyether copolymer, the polycarbonate resin is hydrolyzed while releasing carbonic acid gas due to the antimony compound, which remains in the composition, when the copolymer is heated such as in molding, thus resulting in formation of silver streaks or occurrence of foaming on the surface of the obtained molding.

The germanium compound is selected by the present inventors as a catalyst for producing the polyester-polyether copolymer, which has an activity equal to or higher than that of the antimony compound, but has no problem of the hydrolysis of the polycarbonate resin, which is caused in the antimony compound.

The germanium compound used as the catalyst in the present invention may include germanium oxides such as germanium dioxide, germanium alkoxides such as germanium tetraethoxide and germanium tetraisopropoxide, germanium hydroxide and alkali metal salts thereof, germanium glycolate, germanium chloride, germanium acetate, and the like. They may be used alone or as a mixture of two or more kinds. Of these germanium compounds, germanium dioxide is particularly preferable.

The amount of the germanium dioxide catalyst, which is added during the polymerization, is preferably from 50 to 2000 ppm and more preferably 100 to 1000 ppm, of the amount of the polyester-polyether copolymer in terms of the reaction speed and the economy.

As the aromatic dicarboxylic acid, terephthalic acid is particularly preferable, and in addition to this it may include isophthalic acid, diphenyl dicarboxylic acid, diphenoxyethane dicarboxylic acid, and the like. In addition to the aromatic dicarboxylic acid, another aromatic oxycarboxylic acid such as oxybenzoic acid, or an aliphatic or alicyclic dicarboxylic acid such as adipic acid, sebacic acid, or cyclohexane-1,4-dicarboxylic acid may be co-used in a small ratio (15% or less).

The diol is a low molecular weight glycol component, forming ester units, and may include low molecular weight glycols having 2 to 10 carbon atoms such as ethylene glycol, trimethylene glycol, tetramethylene glycol, hexanediol, decanediol, cyclohexanedimethanol, and the like. Ethylene glycol, trimethylene glycol, and tetramethylen glycol are particularly preferable, because they can be easily obtained.

A methyl group is preferable as the alkyl group in the dialkyl aromatic dicarboxylate in terms of the interesterification reactivity.

As for the solution viscosity of the aromatic polyester in the polymer described above, the logarithmic viscosity (IV), determined at 25° C. in a mixed solvent of phenol/tetrachloroethane=1/1 (a weight ratio), is preferably within a range of 0.30 to 1.00 and more preferably 0.45 to 0.60 at a concentration of 0.5 g/dl (5 g/l), in terms of the impact resistance, the chemical resistance, and the molding processability of the obtained molded article.

<3> Aromatic Polyester Unit

The aromatic polyester unit, used in the present invention, is a polymer or copolymer obtained from an aromatic dicarboxylic acid or its derivative capable of producing an ester and diol or its derivative capable of producing an ester, and is usually an alternating polycondensation product.

Preferable examples of the aromatic polyester unit may include a polyethylene terephthalate, a polyethylene terephthalate copolymer, a polytetramethylene terephthalate, a polytetramethylene terephthalate copolymer, a polytrimethylene terephthalate, and a polytrimethylene terephthalate copolymer, and more preferable examples may include one or more units selected from the group consisting of polyethylene terephthalate units, a polybutylene terephthalate units, and a polypropylene terephthalate units.

<4> Modified Polyether Unit

The modified polyether unit used in the present invention is the unit represented by the general formula 1 and preferably the unit represented by the general formula 2. As for the number, m and n, of the repeating oxyalkylene units in the general formulae 1 and 2, when the number average of (m+n) is less than 20, the thermal stability is improved a little, and when the number average of (m+n) is more than 60, the moldability is reduced. It is necessary, accordingly, that the number average of (m+n) is 20 or more and 60 or less. The lower limit is preferably 25 or more and more preferably 30 or more.

4. Impact Resistance Improver

<1> Core/Shell Graft-Polymer

The core/shell graft-polymer refers to a product obtained by graft-polymerizing the specific rubbery elastomer with the specific vinyl compound (monomer).

The rubbery elastomer has a glass transition temperature of preferably 0° C. or lower and more preferably −40° C. or lower.

Examples of such a rubbery elastomer may include diene rubber such as polybutadiene, a butadiene-styrene copolymer, a butadiene-acrylic acid ester copolymer, a butadiene-acrylonitrile copolymer; acrylic rubber such as poly(butyl acrylate), poly(2-ethylhexyl acrylate), dimethylsiloxane-butyl acrylate rubber, and silicon/butyl acrylate composite rubber; olefin rubber such as an ethylene-propylene copolymer, an ethylene-propylene-diene copolymer; polydimethylsiloxane rubber, and dimethylsiloxane-diphenylsiloxane copolymer rubber. Examples of the butadiene-acrylic acid ester copolymer may include a butadiene-butyl acrylate copolymer, and a butadiene-2-ethylhexyl acrylate copolymer. It is preferable to use the polybutadiene, the butadiene-styrene copolymer, or the butadiene-butyl acrylate copolymer, in terms of the impact resistance.

Of the butadiene-butyl acrylate copolymers, a copolymer including 50 to 70% by weight of butyl acrylate and 30 to 50% by weight of butadiene is preferable in terms of the weatherability and the impact resistance.

The average particle diameter of the rubbery elastomer is not particularly limited, and it is preferably within a range of 0.05 to 2.00 m and more preferably 0.1 to 0.4 µm. The gel content is not also particularly limited, and it is preferably within a range of 10 to 99% by weight and more preferably 80 to 96% by weight.

The vinyl compound, used in the production of the core/shell graft-polymer, may include, for example, aromatic vinyl compounds, vinyl cyanide compounds, (meth) acrylic acid ester compounds such as acrylic acid esters and methacrylic acid ester, and the like. They may be used alone or as a mixture of two or more kinds. Particularly preferable examples of the aromatic vinyl compound may include styrene and α-methyl styrene; particularly preferable examples of the vinyl cyanide compound may include acrylonitrile and methacrylonitrile; particularly preferable examples of the acrylic acid ester may include butyl acrylate and 2-ethylhexyl acrylate; and particularly preferable examples of the methacrylic acid ester may include methyl methacrylate.

When the core/shell graft-polymer is prepared, the rubbery elastomer and the vinyl compound is preferably used in a percent of 10 to 90% by weight and more preferably 30 to 85% by weight of the rubbery elastomer and a percent of 90 to 10% by weight and more preferably 70 to 15% by weight of the vinyl compound. When the percent of the rubbery elastomer is less than 10% by weight, the impact resistance tends to be reduced, and when it is more than 90% by weight, the heat resistance tends to be reduced.

It is particularly preferable to use a core/shell graft-polymer produced using an organic phosphorus emulsion in terms of the thermal stability.

<2> Polyolefin Polymer

Example of the polyolefin polymer may include polyethylene, polypropylene, and the like, and they are preferably used. The polyolefin polymer, however, is not limited thereto. The polyolefin polymer may be a homopolymer or a copolymer such as an ethylene-propylene copolymer, an ethylene-butene copolymer, an ethylene-4-methylpentene copolymer, an ethylene-hexene copolymer, an ethylene-octene copolymer, or a propylene-butene copolymer. The degree of polymerization of the polyolefin polymer is not also particularly limited, and any polymer having a melt index within a range of 0.05 to 50 g/10 minutes may be usually selected and used. Of such polyolefin polymers, the ethylene-butene copolymer, the ethylene-hexene copolymer, and the ethylene-octene copolymer are preferable because the impact resistance can be further improved.

<3> Olefin-Unsaturated Carboxylic Acid Ester Copolymer

The olefin in the olefin-unsaturated carboxylic acid ester copolymer may include, for example, ethylene, propylene, 1-butene, 1-pentene, 1-hexene, 1-octene, and the like. The olefins may be used alone or as a mixture of two or more kinds. The particularly preferable olefin is ethylene.

The unsaturated carboxylic acid ester in the olefin-unsaturated carboxylic acid ester copolymer may include, for example, methyl acrylate, ethyl acrylate, n-propyl acrylate, i-propyl acrylate, n-butyl acrylate, t-butyl acrylate, 2-ethyl-hexyl acrylate, glycidyl acrylate, methyl methacrylate, ethyl methacrylate, n-propyl methacrylate, i-propyl methacrylate, n-butyl methacrylate, t-butyl methacrylate, 2-ethyl hexyl methacrylate, glycidyl methacrylate, and the like. They may be used alone or as a mixture of two or more kinds. The particularly preferable alkyl (meth)acrylates are the methyl acrylate, ethyl acrylate, and glycidyl methacrylate.

The copolymerization ratio of the olefin units and the unsaturated carboxylic acid ester units in the olefin-unsaturated carboxylic acid ester copolymer is preferably from 40/60 to 95/5 and more preferably from 50/50 to 90/10 by weight. When the weight ratio of the alkyl (meth)acrylate ester units in the copolymer is less than 5, there are many case where the effect of improving the chemical resistance is insufficient. When the weight ratio of the unsaturated carboxylic acid ester units in the copolymer is more than 60, there are many cases where the thermal stability is insufficient during melting (for example during the mold-processing).

The olefin-unsaturated carboxylic acid ester copolymer can be further copolymerized with vinyl acetate, styrene, or the like.

The olefin-unsaturated carboxylic acid ester copolymer may include, for example, ethylene-methyl acrylate copolymers, ethylene-ethyl acrylate copolymers, ethylene-propyl acrylate copolymers, ethylene-butyl acrylate copolymers, ethylene-hexyl acrylate copolymers, ethylene-2-ethylhexyl acrylate copolymers, ethylene-methyl methacrylate copolymers, ethylene-butyl methacrylate copolymers, ethylene-hexyl methacrylate copolymers, ethylene-2-ethylhexyl methacrylate copolymers, ethylene-glycidyl acrylate copolymers, ethylene-glycidyl methacrylate copolymers, ethylene-glycidyl acrylate-vinyl acetate copolymers, ethylene-glycidyl methacrylate-vinyl acetate copolymers, ethylene-glycidyl acrylate-methyl acrylate copolymers, ethylene-glycidyl methacrylate-methyl acrylate copolymers, and the like. Of these, the ethylene-ethyl acrylate copolymer, ethylene-glycidyl methacrylate copolymer, ethylene-glycidyl methacrylate-vinyl acetate copolymer, and ethylene-glycidyl methacrylate-methyl acrylate copolymer are preferable, because the impact resistance can be further improved.

<4> Thermoplastic Polyester Elastomer

The thermoplastic polyester elastomer refers to a copolymer including an aromatic dicarboxylic acid or its derivative capable of forming an ester, a diol or its derivative capable of forming an ester, and a polyether having a number average molecular weight of 700 to 3000, and in the copolymer, a percent of a component derived from the polyether is preferably within a range of 5 to 80% by weight and more preferably 10 to 70% by weight. When the percent of the component derived from the polyether is less than 5% by weight, the impact resistance tends to be reduced, and when it is more than 80% by weight, the heat resistance is easily reduced.

As for the solution viscosity of the thermoplastic polyester elastomer, a logarithmic viscosity (IV), determined at 25° C. in a mixed solvent of phenol/tetrachloroethane=1/1 (a weight ratio), is preferably within a range of 0.3 to 2.0 and more preferably 0.4 to 1.5 at a concentration of 0.5 g/dl (5 g/l). When the logarithmic viscosity is less than 0.3, the impact resistance, the chemical resistance, and the like are easily reduced, and when it is more than 2.0, the molding processability, and the like tend to be reduced.

Examples of the aromatic dicarboxylic acid or its derivative capable of forming an ester, used in the production of the thermoplastic polyester elastomer, may include terephthalic acid, isophthalic acid, their derivatives capable of forming an ester, and the like. They may be used alone or as a mixture of two or more kinds.

On the other hand, the diol or its derivative capable of forming an ester may include, for example, ethylene glycol, propylene glycol, tetramethylene glycol, their derivatives capable of forming an ester, and the like. They may be used alone or as a mixture of two or more kinds. The polyether may include, for example, poly(ethylene glycol), poly(propylene glycol), poly(tetramethylene glycol), copolymers of ethylene oxide and propylene oxide, and the like. They may be used alone or as a mixture of two or more kinds. The polyether has preferably a number average molecular weight within a range of 700 to 3000. When the molecular weight is less than 700, the heat resistance tends to be reduced, and when it is more than 3000, the thermal stability tends to be reduced.

5. Platy Filler

The platy filler used in the present invention refers to a component capable of decreasing the linear expansion property of the molding from the resin composition of the present invention. As such a platy filler, an alkaline inorganic substance including silica or alumina as the main component thereof can be used, and the shape thereof may include a flat plate shape, a flaky shape, a scaly shape, and the like. The filler has preferably a number average long diameter (the longest length in the filler) of 0.1 µm or more and 40 µm or less and more preferably 0.1 µm or more and less than 25 µm in terms of the low linear expansion property and the surface appearance of the molded article. In terms of the thermal stability, a range of 25 µm or more and 40 µm or less is more preferable. For that reason, in terms of the balance in the low linear expansion property, the surface appearance, and the thermal stability, it is preferable that a mixed ratio (a weight basis) of a platy filler (I) having a number average long diameter of 0.1 µm or more and less than 25 µm to a platy filler (II) having a number average long diameter of 25 µm or more and 40 µm or less, [a weight ratio of (I) to the total platy filler]/[a weight ratio of (II) to the total platy filler], is from 25%/75% to 50%/50%.

A number average aspect ratio of the platy filler, i.e., [a long diameter of the platy filler]/[a thickness of the platy filler (a length of a straight line vertical to the largest plane including the straight line in the filler)] is preferably 10 or more and more preferably 15 or more in terms of the low linear expansion property and the impact resistance.

The number average long diameter and the number average aspect ratio described above are each a number average values of platy filler particles, measured with a stereoscopic microscope.

As the platy filler used in the present invention, a material including silica or alumina as the main component, and including one or more members selected from the group consisting of mica, talc, montmorillonite, sericite, kaolin, glass flake, platy alumina, and synthesized hydrotalcite is preferable in order to realize a dispersion state of the components in the specific molding of the present invention as described below; mica, talc, montmorillonite, sericite, kaolin, and glass flake are more preferable in the terms of the effect of improving the dimensional stability in the present invention; mica, talc, and glass flake are more preferable in terms of the balance in the impact resistance, the fluidity, and the appearance of the product; and mica is particularly preferable.

The mica may be natural or synthesized, and may be any of muscovite, biotite, and phlogopite.

6. Long Glass Fiber

The long glass fiber used in the resin composition of the present invention refers to glass fiber obtained by melting glass, and drawing the molten glass into a fibrous state. The long glass fiber may include, for example, filament glass fibers obtained by melt-spinning glass such as E glass (Electrical glass), C glass (Chemical glass), A glass (Alkali glass), S glass (High strength glass), and alkali-resistant glass, and E glass is preferable.

The average fiber diameter of the long glass fiber is from 3 to 30 µm, preferably from 9 to 25 µm, more preferably from 11 to 23 µm and particularly preferably from 13 to 18 µm. When the average fiber diameter is too small, the productivity of reinforced fiber bundles may be sometimes reduced because of easy occurrence of breakage of the fibers, and, undesirably, it is necessary that a large number of fibers are bundled when pellets are continuously produced, and thus the labor to connect the fiber bundles is troublesome or the productivity is reduced. In a case where a preferable length of a pellet is settled, if the fiber diameter is too large, undesirably, the aspect ratio of the fiber is reduced and thus the reinforcement effect may sometimes be insufficiently exhibited.

As the long glass fiber, a continuous glass fiber bundle can be used, which is commercially available as a glass roving. In addition to the glass roving, a cake described in JP-A No. H06-114830 can be used. The pellet, for example, has preferably a length of 4 to 20 mm, more preferably 5 to 16 mm, still more preferably 6 to 14 mm, and particularly preferably 8 to 12 mm. The pellet diameter is not particularly limited, and is, for example, from 0.5 to 4 mm.

The average aspect ratio, i.e., (an average length of the glass fiber)/(an average diameter of the glass fiber), of the long glass fiber in the pellet is from 50 to 6000, preferably from 75 to 2000, more preferably from 100 to 1500, and particularly preferably from 200 to 1000. When the average aspect ratio is too small, the reinforcement effect may sometimes be insufficiently exhibited, and when the average aspect ratio is too large, plasticization may sometimes be unstable during the molding or poor dispersion of the long glass fibers may sometimes occur.

The long glass fiber used in the present invention is preferably treated with a silane coupling agent for improving the impact resistance. The fiber is also preferably subjected to a sizing treatment with an epoxy or urethane surface treating agent for improving the heat resistance.

The commercially available glass roving, which can be used as the long glass fiber in the present invention, may include, for example, but is not limited to, EX-1437 manufactured by Nippon Electric Glass Co., Ltd. (a fiber diameter of 17 µm, an aminosilane coupling agent, an epoxy emulsion, and gathering of about 4000 fibers), ERS2310-LF702 available from Central Glass Co., Ltd. (a fiber diameter of 17 µm, an aminosilane coupling agent, using a urethane emulsion, and gathering of about 4000 fibers), and the like.

7. Stabilizer

As the stabilizer, one or more stabilizers selected from the group consisting of phenol stabilizers, phosphorus stabilizers, and sulfur stabilizers are preferable, and it is more preferable to use the stabilizers described above in combination, because of the excellent flame retardance.

Hindered phenol stabilizers are more preferable as the phenol stabilizer and are exemplified by pentaerythritol tetrakis[3-(3,5-di-t-butyl-4-hydroxyphenyl)propionate (for example, Irganox 1010® manufactured by Chiba Specialty Chemicals Inc.), but they are not limited thereto.

The more preferable phosphorus stabilizers are phosphite stabilizer, and may include, for example, but are not limited to, tris(2,4-di-t-butylphenyl)phosphite (for example, Adekastab 2112® manufactured by Adeka Corporation).

8. Additive

In addition to the components described above, to the resin composition of the present invention may added as an additive, for example, a light stabilizer, a flame retardant, a plasticizer, a lubricant, a releasing agent, a ultraviolet absorber, an anti-static agent, a pigment or dye, an inorganic filler, acrylonitrile-styrene copolymer, a polyethylene terephthalate, a polybutylene terephthalate, and the like.

(Production Method of Resin Composition)

The resin composition of the present invention can be produced in any already known method. The method may include, for example, but is not limited to, a method in which the polycarbonate resin, the specific polyester-polyether copolymer, and the optional other components used as necessary are mixed using a blender, a super mixer, or the like, and the mixture is kneaded in a single-screw or multi-screw extruder to obtain pellets. The mixture may be melt-kneaded by heating the mixture when it is kneaded. The temperature conditions can be appropriately decided.

(Molding)

The resin composition of the present invention is preferable as a material for various moldings, and is particularly preferable as a material for a large-sized, thin-wall molding. The molding obtained using the resin composition of the present invention can be a large-sized, thin-wall molding whose projected area is from 10000 mm$^2$ to 10000000 mm$^2$. The molding has preferably a projected area of 30000 mm$^2$ to 7000000 mm$^2$, and more preferably 50000 mm$^2$ to 4000000 mm$^2$ in terms of the surface appearance, the heat resistance, and the impact resistance. The molding obtained using the resin composition of the present invention can also be a large-sized, thin-wall molding whose average wall thickness of less than 3.0 mm and 0.1 mm or more. It is possible to adjust the average wall thickness to less than 2.5 mm, or less than 2.0 mm. The lower limit of the average wall thickness is preferably 1.0 mm or more, and more preferably 1.5 mm or more in terms of the surface appearance, the heat resistance, and the impact resistance. Furthermore, it is also possible to obtain a large-sized, thin-wall molding whose length from a part of the molding corresponding to an inlet of a mold gate to an edge of the molding (the substantially longest distance among flow distances of the resin composition when the composition flows in a cavity of the mold) is more than 500 mm.

Even if it has the projected area as described above, the large-sized, thin-wall molding obtained using the resin composition of the present invention has preferably a linear expansion coefficient in the face, determined at a measurement temperature between −30° C. and +80° C., of $6.0 \times 10^{-5}$/° C. or less, and more preferably $4.0 \times 10^{-5}$/° C. or less. The linear expansion coefficient is preferably $3.5 \times 10^{-5}$/° C. or more. When the conditions described above are satisfied, the large-sized, thin-wall molding has the shape stability, and it can be preferably used, for example, as a molding for parts for a household electric appliance or parts for a vehicle. In particular, the molding for the parts for a household electric appliance, the parts for a vehicle, or the like, is often used in contiguity with a metal material or the like, and thus it may sometimes be exposed to a high temperature condition due to radiant heat or heat conduction from the metal material having a high temperature. However, because the molding of the present invention has the linear expansion coefficient as described above, it is possible to prevent the thermal deformation caused by the radiant heat or heat conduction from the metal material, and the shape stability is excellent.

More specifically, when the linear expansion coefficient in the face of the molding of the present invention, which has a projected area of more than 30000 mm$^2$, a length from a gate to an edge of more than 500 mm, and an average wall thickness of less than 2.5 mm, is determined at a measurement temperature between −30° C. and +80° C., the coefficient is preferably $6.0 \times 10^{-5}$/° C. or lower and more preferably $4.0 \times 10^{-5}$/° C. or lower. In addition, a molding having a projected area of more than 60000 mm$^2$, an average wall thickness of less than 2.5 mm, and a linear expansion coefficient in the face, determined at a measurement temperature between −30° C. and +80° C., of $6.0 \times 10^{-5}$/° C. or lower is preferable, and the molding having the coefficient of $4.0 \times 10^{-5}$/° C. or lower is more preferable.

The molding of the present invention, having such properties, can be preferably used as a molding for parts for a vehicle and the like. The molding can be used preferably as an exterior part for an automobile among the parts for a vehicle, and can be particularly preferably applied to a garnish, a pillar, or a spoiler.

The molding of the present invention has the good surface appearance and a high adhesive property of a coating, when the surface of the molding is subjected to coating. The resin composition of the present invention has the excellent fluidity, and thus the molding has a good smoothness over the whole surface thereof, and has the good surface appearance and the high adhesive property of the coating after the molding is coated, even if the molding obtained using the resin composition is particularly large-sized, thin-wall molding. A known coating material and a coating method can be appropriately selected and adopted for coating.

(Production Method of Molding)

The resin composition of the present invention can be molded employing any known method. The composition can be molded, for example, by injection molding, extrusion molding, blow molding, compression molding, or the like. Of these, the injection molding is preferable. The resin composition of the present invention can also be applied to a compound such as an in-line compound process or a direct compound process, as described in Plastics Info World 11/2002 P 20-35, whereby the molding can be obtained.

The resin composition of the present invention may be molded as it is, or a blend of the composition with a diluent may also be used for molding. When pellets obtained using the resin composition including long glass fibers (hereinafter may sometimes be referred to as a "fiber-reinforced resin composition") are used, the pellets may be blended with a diluent in a dry blending method. It is rather preferable that the dry-blended composition is directly supplied to a molding machine such as an injection molding machine without passing through an extruder, in order to retain the fiber length in the resin composition and obtain the higher rigidity and the effect of improving the impact resistance and the durability. The blending ratio of the diluent is decided by a content of the long glass fibers in the fiber-reinforced resin composition pellets, and the content of the long glass fiber desired in the final molding, but the content thereof is preferably from 20 to 85% by weight of the fiber-reinforced resin composition, in terms of the improvement effects of the rigidity, the impact resistance, and the durability.

(Use of Resin Composition and Molding Therefrom)

The resin composition according to the present invention, as described above, can be used as a resin composition, which is a material for the parts for a household electric appliance, the parts for a vehicle such as an automobile, electric or electronic parts, or general goods, by means of various known methods such as an injection molding method and an extrusion method.

In addition, the molding molded using the resin composition has the excellent heat resistance, impact resistance, rigidity, dimensional stability, chemical resistance, molding processability, weatherability, and thermal stability, and excellent surface gloss, appearance, and coating property. The molding of the present invention, accordingly, can be preferably used as exterior parts for an automobile, which are obtained by an injection molding, and among them the molding is particularly preferable as a garnish, a pillar, or a spoiler.

EXAMPLES

The resin composition of the present invention is specifically described in reference to Examples.

In measurement conditions and Examples described below, "parts" and "%" are respectively "parts by weight" and "% by weight."

First, materials used and measurement conditions are described below.
(Polycarbonate Resin)

TARFLON A2200®, manufactured by Idemitsu Kosan Co., Ltd., which has a viscosity average molecular weight of 22,000, was used as the polycarbonate resin. In Tables 2 to 5, it is denoted as PC.
(Polyester-Polyether Copolymer: B1 to B12)

To a reactor equipped with a stirrer and a gas exhaust outlet were put polyethylene terephthalate (IV=0.65) produced using a germanium catalyst, germanium dioxide, a stabilizer (Irganox 1010, manufactured by Chiba Specialty Chemicals Inc.), and modified polyethers shown in Table 1, and the mixture was kept at 270° C. for 2 hours. After that, the reduction of pressure was performed with a vacuum pump, and polycondensation was performed at 1 torr (133 Pa). The polycondensation reaction time (an elapsed time from the time at which the pressure reached 1 torr (133 Pa)) at 270° C. was shortened thereby adjusting the molecular weight. The polycondensation reaction time is, accordingly, from 0.5 hours to 3 hours. When the pre-determined time elapsed, the reduction of pressure was finished to stop the reaction, and various polyester-polyether copolymers B1 to B12 produced were taken out therefrom. The strands, which were cooled in a water tank, were subjected to post-crystallization and drying at the same time in a hot air dryer having a temperature set at 100° C. After that, the resulting product was thrown into a pulverizer and pelletized to obtain pellets of polyester-polyether copolymers B1 to B12. The polyester-polyether copolymer having a smaller molecular weight and a smaller IV value can be obtained as the polycondensation reaction time becomes shorter. B8 and B10 were produced in accordance with a method described in Patent Document 1 (the polycondensation reaction time was 3 hours), and had an IV value of 1.20.
(Polyester-Polyether Copolymer: B13)

To a reactor equipped with a stirrer and a gas exhaust outlet were put bishydroxyethylene terephthalate (BHET), which is a starting material of polyethylene terephthalate, germanium dioxide, a stabilizer (Irganox 1010, manufactured by Chiba Specialty Chemicals Inc.), and modified polyethers shown in Table 1, and the mixture was kept at 190° C. for 2 hours. After that, the temperature was gradually elevated and at the same time the pressure was gradually reduced with a vacuum pump, and when the temperature and the pressure finally reached 270° C. and 1 torr (133 Pa) respectively, the polycondensation was performed. When the pre-determined polycondensation reaction time (1.5 hours) elapsed, the reduction of pressure was finished to stop the reaction, and various polyester-polyether copolymers B13 produced was taken out therefrom. The strands, which were cooled in a water tank, were subjected to post-crystallization and drying at the same time in a hot air dryer having a temperature set at 100° C. After that, the resulting product was thrown into a pulverizer and pelletized to obtain pellets of polyester-polyether copolymer B13. The obtained polyester-polyether copolymer has a polyether ratio of 25 wt % and an IV value of 0.49.

TABLE 1

| | B1 | B2 | B3 | B4 | B5 | B6 | B7 | B8 | B9 | B10 | B11 | B12 | B13 |
|---|---|---|---|---|---|---|---|---|---|---|---|---|---|
| PET | | 80 | | | | 75 | | | 70 | 70 | 70 | | |
| BHET | | | | | | | | | | | | | 80 |
| 18EN | | | | | | | | | | | 30 | | |
| 30EN | | 20 | | | | 25 | | | 30 | | | | 20 |
| 60EN | | | | | | | | | | | | 30 | |
| Polycondensation reaction time | 0.6 h | 1.1 h | 2.4 h | 0.5 h | 0.6 h | 1.1 h | 2.4 h | 3.0 h | 0.6 h | 3.0 h | 1.7 h | 1.1 h | 0.7 h |
| IV value | 0.45 | 0.60 | 1.00 | 0.42 | 0.45 | 0.60 | 1.00 | 1.20 | 0.45 | 1.20 | 0.80 | 0.60 | 0.49 |

In Table 1, PET denotes a polyethylene terephthalate, which is produced by a polymerization with a germanium catalyst and has an IV of 0.65; bishydroxyethylene terephthalate (BHET) denotes BHET manufactured by Petrefinetechnology. Co., Ltd.; Bisol 18EN denotes a compound having a structure represented by the general formula 2 wherein the number average of (m+n) is 18; Bisol 30EN denotes a compound having a structure represented by the general formula 2 wherein the number average of (m+n) is 30; and Bisol 60EN denotes a compound having a structure represented by the general formula 2 wherein the number average of (m+n) is 60.

In addition, the IV value in Table 1 is a value calculated from a logarithmic viscosity at 0.5 g/dl measured at 25° C. in a mixed solvent of tetrachloroethane/phenol=50/50 (weight ratio). The numerical values of each composition in Table 1 are described as parts by weight.
(Impact Resistance Improver)

A core/shell graft-copolymer, KaneAce M732 manufactured by Kaneka Corporation
(Platy Filler: D)
(D-1) Number average long diameter: 27 μm. Muscovite Mica A-21S: Yamaguchi Mica Co., Ltd.
(D-2) Number average long diameter: 40 μm, Muscovite Mica A-41S: Yamaguchi Mica Co., Ltd.
(D-3) Number average long diameter: 10 μm, Muscovite Mica AS800: Tomoe Engineering Co., Ltd.

(Long Glass Fiber)

Fiber Diameter: 16 μm, TEX value: 2000 (g/1000 m), an aminosilane coupling agent, treated with an epoxy emulsion (Stabilizer: E)

Irganox 1010 (a hinderd phenol) manufactured by Chiba Specialty Chemicals Inc.

(Releasing Agent: F)

Rikesuta-EW-400 (pentaerythritol full stearate) manufactured by Riken Vitamin Co., Ltd.

(Fluidity; Spiral (2 mm))

Using an injection molding machine FAS-150 manufactured by Fanuc Corporation, molding was performed at a cylinder temperature of 280° C., a mold temperature of 80° C., and an injection pressure of 1000 kg/cm$^2$. A flow length of a spiral molding (a width of 10 mm×a thickness of 2 mm, a pitch of 5 mm) was measured.

(Izod Impact Value; IZOD (with a Notch))

An Izod impact value of each test piece produced in Examples and Comparative Examples was measured at 23° C. in accordance with ASTM D-256, in ¼ inches with a notch.

(Heat Resistance; HDT (Low Load))

A heat resistance of each test piece produced in Examples and Comparative Examples was measured in accordance with ASTM D-696.

(Appearance after Residence Test)

Using an injection molding machine FN-1000 manufactured by Nissei Plastic Industrial Co., Ltd., a 120×120×3 mm flat plate molded article was molded at a cylinder temperature of 280° C. and a mold temperature of 80° C., during which the composition was stayed for 2 minutes in the machine. The appearance of the molded article was visually observed, and evaluated according to the following criteria:

⊚: Flashes are not completely observed on the surface.

○: Flashes are hardly observed on the surface.

Δ: A few flashes are observed on the surface.

×: Flashes are remarkably observed on the surface.

(Evaluation of Large-Sized, Thin-Sall Moldability)

Using a large-sized injection molding machine 850-MG160 manufactured by Mitsubishi Heavy Industries Ltd. a panel part for an automobile, which was a large-sized injection molded article, having a projected area of 600 mm×200 mm (a distance from the gate to the edge of 600 mm), and thicknesses of 2.5 mm, 2.0 mm, and 1.5 mm at three points, was produced at a cylinder temperature of 280° C. and a mold temperature of 80° C., as a test piece. The test piece was visually observed and evaluated according to criteria below. It can be said that the better the surface appearance the better the thin-wall moldability, even if the ends of the molded article are filled, and the obtained panel part for the automobile is thinner.

⊚: The molded article is filled up to the end parts thereof, and flashes are not completely observed.

○: The molded article is filled up to the end parts thereof, and flashes are hardly observed on the surface.

Δ: The molded article is filled up to the end parts thereof, but a few flashes are observed on the surface.

×: The molded article is filled up to the end parts thereof, but flashes are remarkably observed on the surface.

××: The molded article is not filled up to the end parts thereof.

(Evaluation of Linear Expansion Property)

As for a test piece, which was obtained by cutting a central part of a molded article obtained in the method described above, a linear expansion coefficient was evaluated by a test performed at a measurement temperature between −30° C. and +80° C. in a flow direction (MD) and a direction perpendicular to the flow direction (TD), respectively, in accordance with JIS K 7197.

(Evaluation of Coating Property of Molded Article)

A 600 mm×200 mm molded article having a thickness of 2.5 mm, 2.0 mm, or 1.5 mm, obtained in the method described above, was coated and the evaluation was performed according to the criteria below. The insufficient adhesive property of the coating film was that when more than 5/100 peeled lattice cells are generated in a grid peel test, the adhesive property of the coating film was evaluated as insufficient.

○: The surface appearance is good on the coating film surface, and there is no problem in the adhesive property of the coating film.

Δ: The surface appearance is ununiform on the coating film surface, and there is no problem in the adhesive property of the coating film.

×: The surface appearance is ununiform and inferior on the coating film surface, and the adhesive property of the coating film is insufficient.

Examples 1 to 24 and Comparative Examples 1 to 6

A polycarbonate resin (PC), a polyester-polyether copolymer B1 to B13, a polyethylene terephthalate resin (PET), which was obtained by a polymerization with a germanium catalyst, and had an IV of 0.65, an impact resistance improver, a platy filler (D), a long glass fiber, a hindered phenol stabilizer (E), and a releasing agent (F) were premixed in ratios shown in Tables 2 to 5, and each mixture was melt-kneaded in a twin-screw extruder at 280° C. to produce pellets. The numerical values in Tables 2 to 5 are described as parts by weight.

A test piece was produced from the obtained pellets in an injection molding machine FN-1000 manufactured by Nissei Plastic Industrial Co., Ltd. at a cylinder temperature of 280° C. and a mold temperature of 80° C. The test piece was evaluated according to the methods described above. The results are shown in Tables 2 to 5.

As shown in Tables 2 to 5, because the resin composition of the present invention has the excellent fluidity, the excellent moldability is provided even if the molded article is large-sized and has a thin wall, and moreover, the resin composition which is well-balanced in the moldability, the heat resistance, the impact resistance, and the low linear expansion property can be provided. The molding of the present invention is not deteriorated in the surface appearance, and has the excellent heat resistance, impact resistance, and low linear expansion property, even if it is the large-sized, thin-wall molded article.

TABLE 2

| | | Example | | | | | | | |
|---|---|---|---|---|---|---|---|---|---|
| | | 1 | 2 | 3 | 4 | 5 | 6 | 7 | 8 |
| PC | | 70 | 70 | 70 | 70 | 60 | 80 | 70 | 70 |
| B1 | | 30 | | | 30 | | 20 | | |
| B2 | | | 30 | | | | | | |
| B3 | | | | | | | | | |
| B4 | | | | | | | | | |
| B5 | | | | 30 | | 40 | | 30 | |
| B6 | | | | | | | | | 30 |
| B7 | | | | | | | | | |
| B8 | | | | | | | | | |
| B9 | | | | | | | | | |
| B10 | | | | | | | | | |
| B11 | | | | | | | | | |
| B12 | | | | | | | | | |
| B13 | | | | | | | | | |
| PET | | | | | | | | | |
| Impact resistance improver | | | | | 3 | | | | |
| (D-1) | | 20 | 20 | 20 | 20 | 20 | 20 | 20 | 20 |
| (D-2) | | | | | | | | | |
| (D-3) | | | | | | | | | |
| Long glass fiber | | | | | | | | | |
| (E) | | 0.5 | 0.5 | 0.5 | 0.5 | 0.5 | 0.5 | 0.5 | 0.5 |
| (F) | | 1 | 1 | 1 | 1 | 1 | 1 | 1 | 1 |
| Spiral (2 mm) | mm | 575 | 540 | 531 | 510 | 550 | 500 | 520 | 510 |
| HDT (low load) | °C. | 123 | 122 | 121 | 122 | 120 | 126 | 124 | 127 |
| IZOD (with a notch) | J/m | 44 | 46 | 55 | 64 | 41 | 68 | 49 | 51 |
| Appearance after residence test | 2 minutes | ○ | ◎ | ◎ | ○ | ○ | ◎ | ○ | ◎ |
| Surface property of molded article (2.5 mm-thick panel part) | | ◎ | ◎ | ○ | ◎ | ◎ | ◎ | ◎ | ◎ |
| Surface property of molded article (2.0 mm-thick panel part) | | ◎ | ◎ | ○ | ◎ | ◎ | ◎ | ◎ | ◎ |
| Surface property of molded article (1.5 mm-thick panel part) | | ○ | ◎ | ○ | ○ | ◎ | ○ | ○ | ◎ |
| Linear expansion coefficient in MD direction | | 3.4 | 3.5 | 3.5 | 3.2 | 3.8 | 3.4 | 3.1 | 3.5 |
| Linear expansion coefficient in TD direction | | 3.5 | 3.6 | 3.7 | 3.3 | 3.9 | 3.5 | 3.3 | 3.8 |
| Coating property of molded article (2.5 mm-thick panel part) | | ○ | ○ | ○ | ○ | ○ | ○ | ○ | ○ |
| Coating property of molded article (2.0 mm-thick panel part) | | ○ | ○ | ○ | ○ | ○ | ○ | ○ | ○ |
| Coating property of molded article (1.5 mm-thick panel part) | | ○ | ○ | ○ | ○ | ○ | ○ | ○ | ○ |

TABLE 3

| | Example | | | | | | | |
|---|---|---|---|---|---|---|---|---|
| | 9 | 10 | 11 | 12 | 13 | 14 | 15 | 16 |
| PC | 70 | 70 | 70 | 70 | 70 | 70 | 70 | 55 |
| B1 | | | | | | | | |
| B2 | | | | | | | | |
| B3 | | | | | | | | |
| B4 | | 30 | | | | | | |
| B5 | | | | | | | | 45 |
| B6 | | | | | | | | |
| B7 | 30 | | | | | | | |
| B8 | | | | | | | | |
| B9 | | | | | | | | 30 | |
| B10 | | | | | | | | |
| B11 | | | | | | | | |
| B12 | | | | | | | 30 | |
| B13 | | | 30 | 30 | 30 | | | |
| PET | | | | | | | | |
| Impact resistance improver | | | | | | | | |
| (D-1) | 20 | 20 | 20 | 5 | 10 | 20 | 20 | 20 |
| (D-2) | | | | | | | | |
| (D-3) | | | | | | | | |
| Long glass fiber | | | | | | | | |
| (E) | 0.5 | 0.5 | 0.5 | 0.5 | 0.5 | 0.5 | 0.5 | 0.5 |
| (F) | 1 | 1 | 1 | 1 | 1 | 1 | 1 | 1 |

TABLE 3-continued

|  |  | Example | | | | | | | |
|---|---|---|---|---|---|---|---|---|---|
|  |  | 9 | 10 | 11 | 12 | 13 | 14 | 15 | 16 |
| Spiral (2 mm) | mm | 510 | 550 | 510 | 540 | 531 | 516 | 565 | 571 |
| HDT (low load) | ° C. | 126 | 117 | 122 | 119 | 121 | 116 | 115 | 118 |
| IZOD (with a notch) | J/m | 56 | 50 | 68 | 200 | 89 | 83 | 71 | 41 |
| Appearance after residence test | 2 minutes | ◎ | Δ | ◎ | ○ | ○ | ○ | ○ | ○ |
| Surface property of molded article (2.5 mm-thick panel part) |  | ◎ | ○ | ◎ | ◎ | ◎ | ◎ | ◎ | ◎ |
| Surface property of molded article (2.0 mm-thick panel part) |  | ○ | ○ | ◎ | ◎ | ◎ | ◎ | ○ | ◎ |
| Surface property of molded article (1.5 mm-thick panel part) |  | Δ | Δ | ◎ | ○ | ◎ | ○ | ○ | ◎ |
| Linear expansion coefficient in MD direction |  | 3.7 | 3.5 | 3.5 | 4.7 | 4.5 | 3.6 | 3.5 | 4.1 |
| Linear expansion coefficient in TD direction |  | 3.8 | 3.7 | 3.8 | 5.3 | 5.0 | 3.8 | 3.7 | 4.3 |
| Coating property of molded article (2.5 mm-thick panel part) |  | ○ | ○ | ○ | ○ | ○ | ○ | ○ | ○ |
| Coating property of molded article (2.0 mm-thick panel part) |  | ○ | ○ | ○ | ○ | ○ | ○ | ○ | ○ |
| Coating property of molded article (1.5 mm-thick panel part) |  | ○ | ○ | ○ | ○ | ○ | ○ | ○ | ○ |

TABLE 4

|  |  | Example | | | | | | | |
|---|---|---|---|---|---|---|---|---|---|
|  |  | 17 | 18 | 19 | 20 | 21 | 22 | 23 | 24 |
| PC |  | 70 | 70 | 70 | 70 | 70 | 70 | 70 | 70 |
| B1 |  |  |  |  |  |  |  |  |  |
| B2 |  |  |  |  |  |  |  |  |  |
| B3 |  |  |  |  |  |  |  |  |  |
| B4 |  |  |  |  |  |  |  |  |  |
| B5 |  | 30 |  |  |  |  | 30 |  |  |
| B6 |  |  |  |  |  |  |  |  |  |
| B7 |  |  |  |  |  |  |  |  |  |
| B8 |  |  |  |  |  |  |  |  |  |
| B9 |  |  |  |  |  |  |  |  |  |
| B10 |  |  |  |  |  |  |  |  |  |
| B11 |  |  |  |  |  |  |  |  |  |
| B12 |  |  |  |  |  |  |  |  |  |
| B13 |  |  | 30 | 30 | 30 | 30 |  | 30 | 30 |
| PET |  |  |  |  |  |  |  |  |  |
| Impact resistance improver |  |  |  |  |  |  |  |  |  |
| (D-1) |  | 50 |  |  | 5 |  |  |  | 20 |
| (D-2) |  |  | 20 |  |  | 15 |  |  |  |
| (D-3) |  |  |  | 20 | 15 | 5 |  |  |  |
| Long glass fiber |  |  |  |  |  |  | 5 | 15 | 15 |
| (E) |  | 0.5 | 0.5 | 0.5 | 0.5 | 0.5 | 0.5 | 0.5 | 0.5 |
| (F) |  | 1 | 1 | 1 | 1 | 1 | 1 | 1 | 1 |
| Spiral (2 mm) | mm | 490 | 525 | 533 | 531 | 533 | 510 | 500 | 495 |
| HDT (low load) | ° C. | 126 | 123 | 120 | 124 | 122 | 125 | 128 | 135 |
| IZOD (with a notch) | J/m | 38 | 56 | 55 | 51 | 58 | 120 | 150 | 110 |
| Appearance after residence test | 2 minutes | ○ | ◎ | ○ | ◎ | ◎ | ◎ | ○ | ○ |
| Surface property of molded article (2.5 mm-thick panel part) |  | ◎ | ◎ | ◎ | ◎ | ◎ | ○ | ○ | ○ |
| Surface property of molded article (2.0 mm-thick panel part) |  | Δ | ◎ | ◎ | ◎ | ◎ | ○ | ○ | ○ |
| Surface property of molded article (1.5 mm-thick panel part) |  | Δ | ○ | ◎ | ◎ | ◎ | ○ | ○ | ○ |
| Linear expansion coefficient in MD direction |  | 2.9 | 3.9 | 3.4 | 3.5 | 3.5 | 3.0 | 2.8 | 2.5 |
| Linear expansion coefficient in TD direction |  | 3.2 | 4.0 | 3.5 | 3.7 | 3.7 | 3.8 | 3.6 | 3.0 |
| Coating property of molded article (2.5 mm-thick panel part) |  | ○ | ○ | ○ | ○ | ○ | ○ | ○ | ○ |
| Coating property of molded article (2.0 mm-thick panel part) |  | ○ | ○ | ○ | ○ | ○ | ○ | ○ | ○ |
| Coating property of molded article (1.5 mm-thick panel part) |  | ○ | ○ | ○ | ○ | ○ | ○ | ○ | ○ |

TABLE 5

|  |  | Comparative Example | | | | | |
|---|---|---|---|---|---|---|---|
|  |  | 1 | 2 | 3 | 4 | 5 | 6 |
| PC |  | 70 | 60 | 96 | 70 | 70 | 70 |
| B1 |  |  |  |  |  |  |  |
| B2 |  |  |  | 4 |  |  |  |
| B3 |  |  |  |  |  |  |  |
| B4 |  |  |  |  |  |  |  |
| B5 |  |  |  |  |  |  |  |
| B6 |  |  |  |  |  |  |  |
| B7 |  |  |  |  |  |  |  |
| B8 |  |  | 30 |  |  |  |  |
| B9 |  |  |  |  |  |  |  |
| B10 |  |  |  | 20 |  |  |  |
| B11 |  |  |  |  |  | 30 | 30 |
| B12 |  |  |  |  |  |  |  |
| B13 |  |  |  |  |  |  |  |
| PET |  |  | 20 |  |  |  | 30 |
| Impact resistance improver |  |  | 5 |  |  |  |  |
| (D-1) |  | 20 | 20 | 20 | 25 | 20 | 20 |
| (D-2) |  |  |  |  |  |  |  |
| (D-3) |  |  |  |  |  |  |  |
| Long glass fiber |  |  |  |  |  |  |  |
| (E) |  | 0.5 | 0.5 | 0.5 | 0.5 | 0.5 | 0.5 |
| (F) |  | 1 | 1 | 1 | 1 | 1 | 1 |
| Spiral (2 mm) | mm | 480 | 440 | 400 | 525 | 500 | 335 |
| HDT (low load) | ° C. | 127 | 123 | 125 | 127 | 114 | 135 |
| IZOD (with a notch) | J/m | 55 | 80 | 68 | 52 | 61 | 66 |
| Appearance after residence test | 2 minutes | ○ | ○ | ○ | ○ | X | ○ |
| Surface property of molded article (2.5 mm-thick panel part) |  | ○ | ○ | Δ | ○ | X | XX |
| Surface property of molded article (2.0 mm-thick panel part) |  | Δ | Δ | XX | X | X | XX |
| Surface property of molded article (1.5 mm-thick panel part) |  | X | X | XX | X | X | XX |
| Linear expansion coefficient in MD direction |  | 3.6 | 3.5 | 3.3 | 3.2 | 4.8 | 3.5 |
| Linear expansion coefficient in TD direction |  | 3.6 | 3.5 | 3.4 | 3.3 | 5.0 | 3.6 |
| Coating property of molded article (2.5 mm-thick panel part) |  | ○ | Δ | Δ | ○ | X | X |
| Coating property of molded article (2.0 mm-thick panel part) |  | Δ | Δ | Δ | X | X | X |
| Coating property of molded article (1.5 mm-thick panel part) |  | X | X | X | X | X | X |

The invention claimed is:

1. A molding comprising a resin composition comprising 40 parts by weight or more and less than 95 parts by weight of a polycarbonate resin and 5 parts by weight or more and less than 60 parts by weight of a polyester-polyether copolymer as a base resin, wherein the polyester-polyether copolymer is a copolymer which is obtained by a polymerization using a germanium compound catalyst, includes aromatic polyester units and modified polyether units represented by the following general formula 1, and has an IV value within a range of 0.45 to 0.60, the resin composition further comprises, based on 100 parts by weight of the base resin, 5 to 40 parts by weight of a platy filler and/or 5 to 35 parts by weight of a long glass fiber, and the molding has a projected area of more than 30000 mm² and an average wall thickness of less than 2.5 mm,

[C.3]

General Formula 1

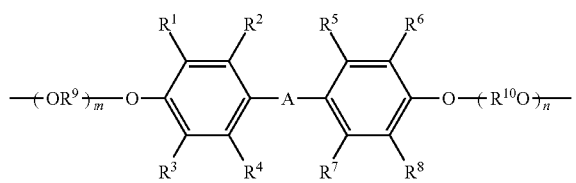

(wherein -A- is —O—, —S—, —SO—, —SO$_2$—, —CO—, an alkylene group having 1 to 20 carbon atoms, or an an alkylidene group having 6 to 20 carbon atoms; $R^1$, $R^2$, $R^3$, $R^4$, $R^5$, $R^6$, $R^7$, and $R^8$ are each a hydrogen atom, a halogen atom, or a monovalent hydrocarbon group having 1 to 5 carbon atoms; $R^9$ and $R^{10}$ are each a bivalent hydrocarbon group having 1 to 5 carbon atoms; they may be the same or different; and m and n show the number of repeating oxyalkylene units, and 20≤m+n≤60).

2. The molding according to claim 1, wherein the polyester-polyether copolymer includes 85 to 65% by weight of the aromatic polyester units and 15 to 35% by weight of the modified polyether units.

3. The molding according to claim 1, wherein the aromatic polyester unit is one or more units selected from the group consisting of a polyethylene terephthalate unit, a polybutylene terephthalate unit, and a polypropylene terephthalate unit.

4. The molding according to claim 1, wherein the modified polyether unit is a modified polyether unit represented by the following general formula 2:

[C.4]

General Formula 2

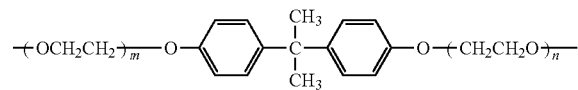

(wherein m and n show the number of repeating oxyalkylene units, and 20≤m+n≤60).

5. The molding according to claim 1, wherein the resin composition comprises 5 to 40 parts by weight, based on 100 parts by weight of the base resin, of the platy filler having a number average long diameter of 0.1 μm or more and 40 μm or less.

6. The molding according to claim 1, wherein, in the platy filler, a ratio (weight basis) of (4) the platy filler having a number average long diameter of 0.1 μm or more and less than 25 μm, to (5) the platy filler having a number average long diameter of 25 μm or more and 40 μm or less, (4)/(5), is from 25%/75% to 50%/50% of the platy filler amount.

7. The molding according to claim 1, which has a projected area of more than 30000 mm², a length from a gate to an edge of more than 500 mm, an average wall thickness of less than 2.5 mm, and a linear expansion coefficient in a face, determined at a measurement temperature between −30° C. and +80° C., of $6.0\times10^{-5}$/° C. or less.

8. The molding according to claim 1, which has a projected area of more than 30000 mm², a length from a gate to an edge of more than 500 mm, an average wall thickness of less than 2.5 mm, and a linear expansion coefficient in a face, determined at a measurement temperature between −30° C. and +80° C., of $4.0\times10^{-5}$/° C. or less.

9. The molding according to claim 1, which has a projected area of more than 60000 mm², an average wall thickness of less than 2.5 mm, and a linear expansion coefficient in a face, determined at a measurement temperature between −30° C. and +80° C., of $6.0\times10^{-5}$/° C. or less.

10. The molding according to claim 1, which has a projected area of more than 60000 mm², an average wall thickness of less than 2.5 mm, and a linear expansion coefficient in a face, determined at a measurement temperature between −30° C. and +80° C., of $4.0\times10^{-5}$/° C. or less.

11. The molding according to claim 1, which is an exterior part for an automobile, obtained by an injection molding.

12. The molding according to claim 1, which is selected from a garnish, a pillar, and a spoiler.

13. A method for producing the molding according to claim 1, comprising obtaining the molding by an injection molding.

14. The molding according to claim 1, wherein the polyester-polyether copolymer having the IV value within the range of 0.45 to 0.60 is obtainable by performing a polycondensation reaction producing the aromatic polyester units and the modified polyether units for 0.6 hours to 1.1 hours.

15. The molding according to claim 1, which the resin composition further comprises 0.5 to 40 parts by weight of an impact resistance improver.

16. The molding according to claim 15, wherein the impact resistance improver is one or more members selected from the group consisting of (1) a core/shell graft-polymer comprising 10 to 90% by weight of a core which is one or more rubbery polymers selected from the group consisting of a polybutadiene, a butadiene-styrene copolymer, a butadiene-acrylic acid ester copolymer, and a polyorganosiloxane, and 90 to 10% by weight of a shell which is formed of a polymer obtained by polymerizing one or more monomers selected from the group consisting of an aromatic vinyl compound, a vinyl cyanide compound, and a (meth)acrylic acid ester compound in the presence of the core, (2) a polyolefin polymer, and (3) an olefin-unsaturated carboxylic acid ester copolymer.

* * * * *